United States Patent [19]

Seyferth et al.

[11] Patent Number: 4,705,837

[45] Date of Patent: Nov. 10, 1987

[54] METHOD FOR CONVERTING SI-H CONTAINING POLYSILOXANES TO NEW AND USEFUL PRECERAMIC POLYMERS AND CERAMIC MATERIALS

[75] Inventors: Dietmar Seyferth, Lexington, Mass.; Yuan-Fu Yu, Dayton, Ohio; Tom S. Targos, Sommerville, Mass.

[73] Assignee: Massachusetts Institute of Technology, Cambridge, Mass.

[21] Appl. No.: 849,390

[22] Filed: Apr. 8, 1986

[51] Int. Cl.$^4$ ............................................. C08G 77/12
[52] U.S. Cl. ...................................... 528/31; 528/38; 525/478; 423/344; 501/88; 501/90; 501/92
[58] Field of Search .................... 528/31, 38; 525/478

[56] References Cited

U.S. PATENT DOCUMENTS

| | | |
|---|---|---|
| 3,108,985 | 10/1963 | Weyer . |
| 3,853,567 | 12/1974 | Verbeek . |
| 3,892,583 | 7/1975 | Winter . |
| 4,310,651 | 1/1982 | Baney et al. . |
| 4,312,970 | 1/1982 | Gaul, Jr. . |
| 4,395,460 | 7/1983 | Gaul . |
| 4,404,153 | 9/1983 | Gaul, Jr. ............................... 528/31 |
| 4,482,669 | 11/1984 | Seyferth et al. .................... 524/442 |
| 4,611,035 | 9/1986 | Brown-Wensley .................. 528/31 |
| 4,639,501 | 1/1987 | Seyferth et al. . |
| 4,645,807 | 2/1987 | Seyferth et al. . |
| 4,650,837 | 3/1987 | Seyferth et al. . |

OTHER PUBLICATIONS

R. W. Rice, Amer. Ceram. Soc. Bull. 62:889–892 (1983).
Penn et al., J. Appl. Polymer Sci. 27:3751–61 (1982).
S. Yajima, Amer. Ceram. Soc. Bull. 62:893–898:903 (1983).
K. Okamura et al., Chem. Lett. (1984) 2059–2060.
K. Okamura et al., Fifth Int. Conf. on Composite Materials 729–8/1/85 Proceedings: 535–542.
Seyferth, D., Prud'homme, C. and Wiseman, G. H., Inorg. Chem. 22:2163–2167 (1983).

Primary Examiner—Melvyn I. Marquis
Attorney, Agent, or Firm—George W. Neuner; Ronald I. Eisenstein

[57] ABSTRACT

A method of forming preceramic polymers using a polysiloxane having repeat units of the formula [RSi(H)O]$_n$ (where R is a lower alkyl group having from 1 to about 6 carbon atoms, a cycloalkyl group having from 3 to about 6 carbon atoms, a substituted or unsubstituted lower aryl group having from 6 to about 10 carbon atoms, n is an integer 1 or greater), by reacting it with a (poly)silylamide is disclosed. Preferably, the poly(silylamide) is a polymeric alkali metal silylamide of the formula [(R$^1$SiHNH)$_a$(R$^1$SiN)$_b$(R$^1$SiHNM)$_c$]$_m$ where a+b+c=1; R$^1$ is a lower alkyl group having from 1 to about 6 carbon atoms, a substituted or unsubstituted cycloalkyl group having from 2 to about 6 carbon atoms, a substituted or unsubstituted alkenyl group having from 2 to about 6 carbon atoms, a substituted or unsubstituted lower aryl group having from 6 to about 10 carbon atoms, a tri(lower)alkyl- or di(lower)alkylsilyl group or a di(lower)alkylamino group; M is an alkali metal or one-half equivalent of an alkaline earth metal; and m is an integer greater than 1. Preferably, a weight ratio of polysiloxane:silylamide of 15:1 to 1:15 is used. Novel preceramic polymers formed by this method are also disclosed.

30 Claims, 16 Drawing Figures

METHOD FOR CONVERTING SI-H CONTAINING POLYSILOXANES TO NEW AND USEFUL PRECERAMIC POLYMERS AND CERAMIC MATERIALS

This invention was made with government support and the government has certain rights in this invention. The Government has rights in this invention pursuant to Contract Number AFOSR-85-0265 awarded by the Department of the Air Force.

The present invention relates to a process for preparing silicon-containing preceramic polymers useful for making silicon oxynitride, silicon carbide, and silicon nitride/silicon carbide, ceramics and for their pyrolysis to such ceramic materials.

There is a great deal of interest in preceramic polymer materials, which can be pyrolyzed to yield silicon carbide, silicon nitride, silicon oxynitride and other silicon-based ceramic materials. R. W. Rice, *Amer. Ceram. Soc. Bull.*, 62: 889-892 (1983). Applications for such polymers include, among others:

1. formation into complex shapes and subsequent pyrolysis to give a ceramic material of the same shape;
2. spinning into continuous fibers whose subsequent pyrolysis yields ceramic fibers;
3. as a matrix material for carbon or ceramic fibers, or as a binder for ceramic powders (with subsequent pyrolysis to form a ceramic body);
4. oxidation-resistant coatings on otherwise oxidizable materials (such as carbon/carbon composites) - after the polymer coating is made, it can be pyrolyzed to give the resistant ceramic coating;
5. infiltration of porous ceramic bodies such as ones obtained from reaction-sintered silicon nitride by the polymer itself (if liquid) or by a solution of the polymer, with subsequent pyrolysis to form a ceramic, resulting in better strength, oxidation resistance, etc., of the body; and
6. formation of thin films of the ceramic material for electronics applications.

For instance, Penn et al., *J. Appl. Polymer Sci.*, 27: 3751-61 (1982) describe the preparation of silicon carbide-silicon nitride fibers from a polycarbosilazane precursor. Tris(N-methylamino) methylsilane monomer was formed by reaction of monomethylamine and methyltrichlorosilane in dry petroleum ether and a polycarbosilazane resin was formed by passing the monomer over glass Raschig rings at 520° C. The brittle polymer was soluble in methylene chloride and chloroform, etc. This product was spun into fibers, crosslinked in air and then pyrolyzed to give ceramic fibers.

Other polymer precursors for forming silicon carbide and silicon nitride ceramics have been described in U.S. Pat. Nos. 3,108,985; 3,853,567; 3,892,583; 4,310,651 and 4,312,970. These linear or crosslinked polymers and processes for producing ceramic materials have generally been found to be deficient in one or more ways.

S. Yajima, *Amer. Ceram. Soc. Bull.*, 62: 893-898; 903 (1983) discloses a method using $(CH_3)_2SiCl_2$ as a starting material for a preceramic polymer for the preparation of SiC-containing ceramics. However, there are many problems associated with these polysilane-derived ceramics.

Silicon oxynitrides are another important group of ceramics. This ceramic material has most of the same advantages as silicon nitride, but is expected to have a better oxidation stability. These are high refractory materials able to withstand temperatures up to about 1500° C. before decomposing. Although K. Okamura et al, *Chem. Lett.* (1984): 2059-2060 (See also K. Okamura et al, *Fifth Int. Conf. on Composite Materials.* July 29-Aug. 1, 1985, Proceedings: 535-542), reported obtaining silicon oxynitride fibers after pyrolysis under ammonia, of $SiO_2$-containing polycarbosilanes (having $[CH_3Si(H)CH_2]$ as the major repeat unit), this was an expensive and inefficient process.

It would be useful to have a polymer precursor that is formed from readily available and relatively cheap starting materials, that is stable at room temperature, is soluble in organic solvents and whose pyrolysis can typically provide a high yield of ceramic products.

SUMMARY OF INVENTION

We have now found that reaction of (1) an organohydrogen-siloxane polymer containing repeat units of the formula $[RSi(H)O]_n$, i.e.,

(where n is an integer 1 or greater, R is a lower alkyl group having from 1 to about 6 carbon atoms, a cycloalkyl group having from 3 to about 6 carbon atoms, or a substituted or unsubstituted lower aryl group having from 6 to about 10 carbon atoms, with (2) a poly(silylamide) yields new polymeric organosilicon compounds which are useful preceramic materials. Upon pyrolysis these typically give ceramic yields significantly better than the original polysiloxane compound. Preferably, the poly(silylamide) is a polymeric alkali metal silylamide of the formula $[(R^1SiHNH)_a(R^1SiN)_b(R^1SiHNM)_c]_m$ (where $a+b+c=1$); $R^1$ is a lower alkyl group having from 1 to about 6 carbon atoms, a substituted or unsubstituted cycloalkyl group having from 3 to about 6 carbon atoms, a substituted or unsubstituted lower alkenyl group having from 2 to about 6 carbon atoms, a substituted or unsubstituted lower aryl group having from 6 to about 10 carbon atoms, a tri(lower)alkyl- or di(lower)alkylsilyl group or a di(lower)alkylamino group; M is an alkali metal or one-half equivalent of an alkaline earth metal; and m is an integer greater than 1). This alkali metal poly(silylamide) may be preformed and added to the polysiloxane which contains repeat units of the formula I. Alternatively, one may prepare the alkali metal silylamide in situ, in the presence of the polysiloxane which contains repeat units of the formula I. Preferably, a ratio of polysiloxane: alkali metal poly(silylamide) of about 15:1 through 1:15 is used.

Aryl-substituted polymers of the type $[RSi(H)O]_n$ (e.g., where R is phenyl), react in the same way as the above described polysiloxanes to give new polysiloxane/organopolysilazane hybrid polymers.

In one embodiment of the present invention, the polymeric alkali metal silylamide is generated by treating the ammonolysis product of $R^1SiHX_2$ ($R^1$ is as defined above and X is a halogen) with a basic catalyst capable of deprotonating the hydrogen from a nitrogen atom adjacent to a silicon atom. The poly(silylamide) thus formed can react with the $[RSi(H)O]_n$ already present. With either the preformed polysilylamide (graft) or the in situ silylamide procedure, the reaction mixture containing the polysilane and the poly(silylamide) is stirred at room temperature and preferably heated at reflux in a suitable solvent such as tetrahydrofuran to complete the reaction. The resulting solution is then cooled and quenched with an organic halide or a silicon halide to produce the organosilicon polymers of the present invention.

The polymers formed by either method can then be pyrolyzed under ammonia to yield silicon oxynitride in high yield, or alternatively, under an inert atmosphere to yield other ceramic materials in high yield.

DETAILED DESCRIPTION OF THE INVENTION

Figure 1:
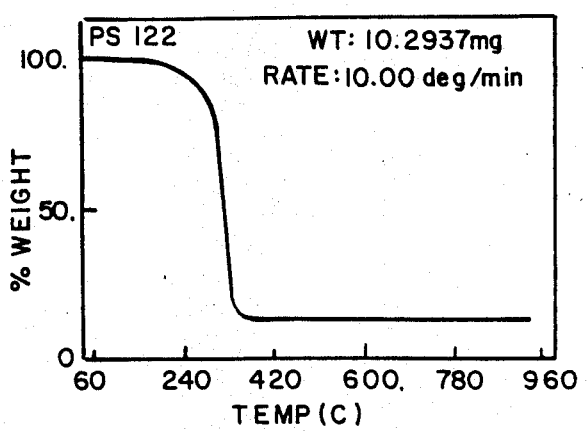
FIG. 1 is a thermogravimetric analysis (TGA) curve of Petrach PS-122.

We have now discovered that the reaction of organohydrogensiloxane polymers containing a plurality of repeat units of the formula $[RSi(H)O]_n$ (where n is an integer 1 or greater, R is a lower alkyl group having from 1 to about 6 carbon atoms, a cycloalkyl group having 3 to about 6 carbon atoms, and a substituted or unsubstituted lower aryl group having 6 to about 10 carbon atoms), (hereinafter polymers containing such repeat units are referred to as "polysiloxanes"), with an alkali metal poly(silylamide) results in a novel preceramic polymer.

The pyrolysis of this new preceramic polymer under a stream of ammonia typically results in a high yield of a white ceramic material. By choosing the correct stoichiometry one is readily able to obtain a ceramic material that is virtually only silicon oxynitride. This process provides silicon oxynitrides at high yield and at low costs. The pyrolysis of the preceramic polymer of the present invention under an inert atmosphere such as nitrogen or argon typically results in a black ceramic solid in high yield. This black ceramic material generally contains SiC, $Si_3N_4$ and $SiO_2$ and can be used as a binder or coating.

The polysiloxane polymer used in the present invention can be readily obtained by the hydrolysis of the appropriate $RSiHCl_2$ (where R is as defined above). The hydrolysis may be steered to give a high yield of cyclic $[RSi(H)O]_n$ oligomer or to produce higher molecular weight linear [RSi(H)O] polymers. They yield of cyclic oligomers (n=4, 5, 6, ...) may be maximized by using the method taught by Seyferth, D., Prud'homme, C; and Wiseman, G. H., *Inorg. Chem.*, 22: 2163–2167 (1983). Additionally, one can use commercially available $[RSi(H)O]_n$ polymers.

The polysiloxane polymers useful in the present invention encompass polymers having a wide range of [RSi(H)O] repeat units. The number of repeat units contained in the polymer will vary depending upon the desired end product.

Preferably, the polysiloxane polymer should contain at least 25 mole % of repeat units of the formula I, i.e. $[RSi(H)O]_n$, in addition to other repeat units, for example, [RR'SiO], [R'R"SiO], R' and R" are defined the same as R; and R, R', and R" may be the same as or different from each other. More preferably the polysiloxane polymer contains at least 35 mole % of repeat units of formula I. Even more preferably, the polymer contains at least 50 mole % repeat units of formula I. Most preferably, the polymer contains at least 75% mole repeat units of formula I.

The polymer may also contain a mixture of repeat units of the above described formula, e.g., both [RSi(H)O] and [R'Si(H)O] (R' is defined the same as R but R' may be different than R). R is preferably a lower alkyl group, more preferably R is $CH_3$.

Further, these aforesaid mixtures of compounds can be used to obtain additional flexibility in tailoring the properties of the aforesaid product. Also included in this invention is the case of aryl-substituted repeat units of [RSi(H)O], for example, where R is a phenyl or substituted phenyl group, as R can be a lower aryl group.

Preferably one uses a polymeric silylamide of the formula $[R^1SiHNH)_a(R^1SiN)_b(R^1SiHNM)_c]_m$, where $a+b+c=1$; $R^1$ is a lower alkyl group having from 1 to 6 carbon atoms, a substituted or unsubstituted cycloalkyl having from 3 to 6 carbon atoms, a substituted or unsubstituted alkenyl group having from 2 to about 6 carbon atoms, a substituted or unsubstituted lower aryl group having from 6 to about 10 carbon atoms, a tri(lower)alkylsilyl or di(lower)alkylsilyl or di(lower)alkylamino group; M is an alkali metal or one-half equivalent of an alkaline earth metal; and m is an integer greater than 1. In the practice of the present invention, $R^1$ preferably is a lower alkyl group, more preferably CH$_3$. These polysilylamide compounds have been described in U.S. Pat. No. 4,482,669, issued Nov. 13, 1984, which is incorporated herein by reference. The above-named patent describes the formation of novel preceramic polysilazanes by treatment of the mainly cyclic ammonolysis product of, for example, CH$_3$SiHCl$_2$, the silazane [CH$_3$SiHNH]$_m$, with catalytic quantities of a base, for example, KH, in organic solvents, for example, tetrahydrofuran (THF). The reaction mixture then is quenched with an electrophile such as CH$_3$I or a chlorosilane. In the former case, a polysilazane of type [(CH$_3$SiHNH)$_a$(CH$_3$SiN)$_b$(CH$_3$SiHNCH$_3$)$_c$]$_m$ is obtained. Prior to the addition of CH$_3$I, a reactive "living" polymer intermediate, an alkali metal silylamide of the type [(CH$_3$SiHNH)$_a$(CH$_3$SiN)$_b$(CH$_3$SiHNM)$_c$]m is present in the THF solution. This intermediate species can react with electrophiles other than CH$_3$I, e.g., with diverse chlorosilanes, etc. Pyrolysis of such CH$_3$I-treated polysilazanes typically yields a ceramic material containing SiC, Si$_3$N$_4$ and "free" carbon.

In one embodiment of the present invention, the use of the polymeric alkali metal silylamide of the formula [(R$^1$SiHNH)$_a$(R$^1$SiN)$_b$(R$^1$SiHNM)$_c$]$_m$ upgrades the polysiloxanes to a new polymer which gives a high ceramic yield on pyrolysis. When this alkali metal silylamide, [(R$^1$SiHNH)$_a$(R$^1$SiN)$_b$(R$^1$SiHNM)$_c$]$_m$ (where m is an integer greater than 1), is reacted with a polysiloxane having repeat units of the formula [RSi(H)O]$_n$, the reaction product after treatment with a suitable electrophile such as an organic or a silyl halide, incorporates both starting materials. When this reaction product is pyrolyzed, the ceramic yield is significantly greater than that of the "parent" polysiloxane polymer. Weight ratios of polysiloxane: polymeric alkali metal silylamide of 1:1 and 1:5 typically provided useful results. Weight ratios of polysiloxane : polymeric alkali metal silylamide from about 15 to about 1 to about 1 to about 15, should also provide useful results. Preferably the weight ratio of polysiloxane; polymeric alkali metal silylamide ranges from about 5:1 to 1:5, and more preferably, from 5:1 to 1:1. However, other ratios can be used depending on the particular starting materials and their pyrolysis characteristics.

The organosilicon polymers thus formed by reaction of polysiloxanes containing repeat units of [RSi(H)O]n with preformed [(R$^1$SiHNH)$_a$(R$^1$SiN)$_b$(R$^1$SiHNM)$_c$]$_m$, followed by treatment with an electrophile, henceforth will be referred to as "graft" polymers.

Mixtures of alkali metal silylamides, i.e., [(R$^1$SiHNH)$_a$(R$^1$SiN)$_b$(R$^1$SiHNM)$_c$]$_m$ and [(R$^{1'}$SiHNH)$_{a'}$(R$^{1'}$SiN)$_{b'}$(R$^{1'}$SiHNM)$_{c'}$]$_{m'}$ (where M is an alkali metal), also may be used.

The preceramic product obtained by using alkali metal silylamides, even in only small amounts, differs from the starting polysiloxane.

The "graft" polymer is formed by combining the already formed polymeric alkali metal silylamide with the polysiloxane in varying proportions in an organic solvent. In one method, the polysiloxane, for example, [CH$_3$Si(H)O]$_n$ oligomers with a high cyclic content, was added slowly to an organic solution such as THF containing the preformed alkali metal silylamide. An immediate reaction with some gas evolution occurred. Thereafter, the mixture is stirred at room temperature for sufficient time for the two compounds to more completely react. Any organic solvent in which both polymer systems are soluble without reaction can be used. Such organic solvents include, for example, THF, diethyl ether, glycol ethers, alkanes, arenes and combinations thereof. The solution of the mixture may be heated above room temperature, and can be refluxed to speed up the completion of the reaction. After refluxing, the mixture is quenched with an electrophile, E-X, to form the organosilicon "graft" polymer. The electrophile can be an alkyl halide, sulfate, or sulfonate; a halosilane; or the like. Typically, CH$_3$I or a chlorosilane is used, although other equivalent electrophiles well-known to those skilled in the art can also be used. E is preferably a lower alkyl group or silyl group; X is preferably a halide, sulfate or sulfonate.

These preceramic organosilicon polymers can then by pyrolyzed under nitrogen or an inert atmosphere to result in ceramic materials in high yield. Typically, pyrolysis under nitrogen gives black ceramic products in a yield of 61-88 weight % (See Table 1). More significantly, pyrolysis under ammonia gives a white ceramic solid in high yield. Analysis has confirmed that these white solids are silicon oxynitrides. These white ceramics contain little, if any, carbon.

What is referred to herein as an "in situ" polymer is obtained by carrying out the cyclo-(R$^1$SiHNH)$_m$/MH reaction in solution in the presence of the polysiloxane. In this method, the polysiloxane is added to the cyclo-(R$^1$SiHNH)$_m$ mixture (generated by reacting in solution anhydrous ammonia with R$^1$SiHX$_2$, where R$^1$ is the same as defined earlier and X is a halogen). The mixture is in an organic solvent, for example, THF. The mixture is then added to a suspension of a basic catalyst capable of deprotonating the hydrogen from a nitrogen atom adjacent to a silicon atom (e.g., KH) in an organic solution. See U.S. Pat. No. 4,482,669. The reaction mixture gradually changes color and hydrogen is evolved. The resulting solution is then stirred at room temperature for sufficient time for the silylamide intermediates and the polysiloxane to react. This solution can be heated above room temperature, and can be heated at reflux to speed up the reaction. Afterwards, the reaction mixture is allowed to cool to room temperature, if required, and quenched with an electrophile such as CH$_3$I or a halosilane, such as a chlorosilane, to produce the organosilicon "in situ" polymer, typically a soluble white powder. The molecular weight of the "in situ" polymer is variable. On pyrolysis under nitrogen or argon this material provides a yield of a black ceramic material, that is typically greater than that obtained on pyrolysis of the polysiloxane (see Table 1). Pyrolysis under ammonia typically results in silicon oxynitrides in high yields.

TABLE 1

| Sample Number | Weight Ratio[a] | TGA Ceramic[b] Yield (%) | Ceramic Yield Argon[c] (%) | Ceramic Yield NH$_3$[d] (%) |
|---|---|---|---|---|
| PS-122[e] | 100:0 | 13 | — | — |
| IV-47 | 1:1 | 78 | 80 | 78.5 |
| IV-48 | 5:1 | 76 | — | — |
| TT-2-33 | 1:1 | 87 | 81 | 83 |
| TT-2-49 | 1:1 | 86 | — | — |
| TT-2-13 | 1:1 | 86 | — | — |
| TT-2-36 | 5:1 | 85 | 83 | 82 |
| IV-43 | 1:1 | 84 | 73 | — |
| TT-2-55 | 1:1 | 82 | — | — |
| TT-2-14 | 1:1 | 88 | — | — |
| TT-2-38 | 5:1 | 61 | — | — |
| IV-45 | 1:1 | 77 | 73 | — |
| TT-2-27 | 1:1 | 86 | 80 | — |
| IV-51 | 1:1 | 88 | — | — |
| TT-2-26 | 1:1 | 79 | — | — |

TABLE 1-continued

| Sample Number | Weight Ratio[a] | TGA Ceramic[b] Yield (%) | Ceramic Yield Argon[c] (%) | Ceramic Yield NH$_3$[d] (%) |
|---|---|---|---|---|
| IV-49 | 1:1 | 62 | — | — |
| TT-2-44 | 1:1 | 61 | — | 58 |
| IV-52 | 1:1 | 80 | — | — |
| TT-2-45 | 1:1 | 75 | — | 65 |

[a]Polysiloxane: alkali metal silylamide
[b]Under nitrogen, 25–1000° C., 10° C./minute;
yield = $\frac{\text{weight residue}}{\text{weight polymer}} \times 100$
[c]25–1000° C., 10° C./minute
[d]25–1000° C., 100° C./hour
[e]Commercial sample (Petrarch) of [CH$_3$Si(H)O]$_n$ The organosilicon polymer formed by either of the above "graft" or "in situ" methods usually is separated from solution. The solvent is removed by using techniques well known to a person of ordinary skill in the art. One standard method is distillation, preferably trap-to-trap distillation. The polymer, typically a white powder that is soluble in an organic solvent, is thereby obtained. One may also combine trap-to-trap distillation with centrifuging, followed by trap-to-trap distillation to separate the polymer from solution.

The "in situ" preceramic polymer differs physically from the "graft" preceramic polymer. Major differences are observed in the form of their thermogravimetric analysis (TGA) curves. Both types of polymers are useful as preceramic materials, especially in forming silicon oxynitrides, containing little, if any, carbon.

Because the present preceramic polymer results from a combination of a polysiloxane polymer (A) and an alkali metal (poly)silylamide (B), the ratio of Si/O/N of the resultant ceramic material can be broadly varied by adjusting the stoichiometry of the preceramic polymer, i.e. the A:B ratio. For example, at one extreme, the pyrolysis of a CH$_3$I-quenched alkali metal silylamide of the formula [(CH$_3$SiHNH)$_a$-(CH$_3$SiN)$_b$](CH$_3$SiHNCH$_3$)$_c$]$_m$ under NH$_3$ produces white silicon nitride. By approiate selection of reactant stoichiometry it is possible to obtain a cermaic product that is virtually pure silicon oxynitride.

For example, we have found that it is possible to obtain distinct crystalline phase Si$_2$ON$_2$ after pydrolysis under a stream of ammonia from a preceramic polymer obtained by the in situ process. In this instance the weight ratio of polysiloxane:alkali metal poly(silylamide) is about 1:1 and R and R$^1$ are CH$_3$. In the above-described system, deviating from a 1:1 ratio results in a ceramic polymer having some Si$_3$N$_4$ when you use more alkali metal poly(silyamide) or some SiO$_2$ when you use more polysiloxane. It is simple to empirically determine the appropriate weight ratio for a desired cermaic product with the use of any of the claimed starting materials.

The polysiloxane and alkali metal silylamide are typically added in a weight ratio of polysiloxane: alkali metal silylamide from 15:1 to 1:15. Preferably this ratio is about 5:1 to 1:5. More preferably the ratio is about 3:1 to 1:3. Most preferably the ratio is about 1:1.

Physical blends of polymers containing repeat units of [RSi(H)O]$_n$, with the "quenched" [(R$^1$SiHNH)$_a$(R$^1$SiN)$_b$(R$^1$SiHNE)$_c$]$_m$ organosilazane polymer of U.S. Pat. No. 4,482,669 can be used since these react when they are heated together. When approximately equal molar quantities of the polymers where R=CH$_3$, R$^1$=CH$_3$, n=1 and E=CH$_3$, were mixed and finely ground together and then subjected to pyrolysis under argon to 10000° C., a ceramic yield was obtained which although low (42%) was still higher than that which resulted when the polysiloxane was pyrolyzed separately.

The combined polymers obtained by the "graft," "in situ" and physical blend methods can be converted to black ceramic fibers. Pyrolysis under an inert atmosphere of pressed bars of the combined polymers to 10000° C. provides a black solid product. In other experiments, pyrolysis under ammonia results in a white rectangular body. Ceramic bars under either pyrolysis condition were obtained showing low to moderate weight loss and slightly shrunken size The invention will be further illustrated by the examples that follow:

General

All glassware was flamed-dried under vacuum or under a stream of nitrogen prior to use. Tetrahydrofuran (THF) was distilled from sodium benzophenone ketyl. Hexane was distilled from LiAlH$_4$. Solvents were deoxygenated by bubbling nitrogen through them prior to use. Methylchlorosilanes (CH$_3$SiHCl$_2$ and (CH$_3$)$_2$SiCl$_2$) were obtained from Petrarch and were distilled from magnesium before use. Poly(methylhydrosiloxane), [CH$_3$Si(H)O]$_n$, was purchased from Petrarch (Catalog #PS 122) and was used as received.

$^1$H spectra were recorded on a JEOL-FX-90Q spectrometer operating at 90 MHz. Elemental analyses were performed by Galbraith Laboratories, Knoxville, Tenn. Molecular weights were determined by measuring the freezing point depression of a weighed sample of benzene caused by a weighed sample of product. Thermal analysis was performed using a Perkin-Elmer TGS-2 Thermogravimetric Analyzer interfaced with a System 7/4 Thermal Analysis Controller. Samples were heated, under argon, from 25°–10000° C. at a rate of 100° C./minute. Large scale pyrolyses were carried out in fused silica boats using a Lindberg 59344 tube furnace (25°–10000° C., at a rate of 10°C./minute) under an argon atmosphere.

B. Preparation of Siloxanes

1. Preparation of [CH$_3$Si(H)O]$_n$(IV-31)

A 500 ml three-necked, round-bottomed flask equipped with a stir-bar, a reflux condenser, and a serum cap was charged with 90 ml (0.87 mol) of CH$_3$SiHCl$_2$ and 250 ml of CH$_2$Cl$_2$. To the solution was added slowly (syringe pump) 20 ml (1.11 mol) of H$_2$O over a two hour period. The reaction mixture was stirred at room temperature for 24 hours. Eight 100 ml portions of H$_2$O were added to the reaction mixture. The CH$_2$Cl$_2$ layer was washed with two 100 ml portions of H$_2$O and dried over MgSO$_4$. The solvent was removed by rotary evaporation to give 44.5 g (85% yield based on (CH$_3$Si(H)O) unit) of a clear oil. $^1$H NMR (90 MHz, C$_6$D$_6$): δ4.71, 4.69 (broad, SiH, 1 H) 0.23, 0.21 (broad, SiCH$_3$, 3 H) IR (neat, cm$^{-1}$): 2976 (s) 2918(w), 2162(s), 1410(w), 1260(s), 1030–1140 (broad,s), 830–920 (broad,s), 769(s), 715(w).

This is the procedure described by D. Seyferth C. Prud'homme and G.H. Wiseman (*Inorg. Chem.* 22 (1983) 2163) in the hydrolysis of CH$_3$SiHCl$_2$. A good yield of cyclic [CH$_3$Si(H)O]$_n$ oligomers was reported, mostly n=4, 5 and 6, but some higher n (up to n=22) was also obtained in lower yield. The ceramic yield of these oligomers is low and will vary from 0 to 5 % depending upon the pyrolysis conditions and the particular oligomer used.

Preparation of Mixed Siloxane,

[CH$_3$Si(H)O]$_r$[(CH$_3$)$_2$SiO)$_s$]$_n$(IV-46)

A 500 ml three-necked, round-bottomed flask equipped with a stir-bar, a reflux condenser, and a serum cap was charged with 100 ml (0.96 mol) of CH$_3$SiHCl$_2$, 50 ml (0.41 mol) of (CH$_3$)$_2$SiCl$_2$, and 250 ml of CH$_2$Cl$_2$. To the solution there was added 60 ml (3.33 mol) of H$_2$O (slowly by syringe pump) over a 4 hour period. Reaction occurred immediately. The reaction mixture was stirred at room temperature for 24 hours and then was washed with fifteen 200 ml portions of H$_2$O until the H$_2$O washings were neutral. The CH$_2$Cl$_2$ layer was dried over MgSO$_4$ and the solvent was removed by rotary evaporation to give 64.7 g (87% yield by weight) of a clear oil. $^1$H NMR (90 MHz, C$_6$D$_6$): δ4.99 (broad, SiH, 1 H) 0.22, 0.16 (broad, SiCH$_3$, 6H) IR (neat, cm$^{-1}$): 2972(s), 2168(s), 1410(w), 1260(s), 1030–1120 (broad,s), 880(s), 836(s), 804(s), 769(s), 708(w)

3. Characterization of Commercial [CH$_3$Si(H)O]$_n$(Petrarch PS-122) IR (neat): 2982(m), 2171(s), 1413(w), 1262(s), 1030–1140 (s,broad), 860–905 (s,broad), 765(s), 718(w) cm$^{-1}$ $^1$H NMR (C$_6$D$_6$) δ 0.25 (broad s, SiCH$_3$, 3.4H), 5.04 (broad s, SiH, $^1$H)

Average Molecular Weight: 4500–5000 (vendor data)

Ceramic Yield: (TGA, 25°–10000° C., 10° C./minute): 13% (black solid) (FIG. 1 shows the TGA curve of this polymer).

C. Reactions of [(CH$_3$SiHNH)$_a$(CH$_3$SiN)$_b$(CH$_3$SiHNK)$_c$]$_m$ Living Polymer with High Cyclics [CH$_3$Si(H)O]$_n$ ("Graft Procedure").

1. [CH$_3$Si(H)O]$_n$/[CH$_3$SiHNH]$_M$ in 1:1 weight ratio (IV-47)

In a dry box, a 250 ml round-bottomed flask equipped with a stir-bar, reflux condenser, and a serum cap was charged with 0.1 g (2.50 mmol) of KH (4.9 mol%, based on (CH$_3$SiHNH)). THF (150 ml) was added to suspend the KH. (CH$_3$SiHNH)$_m$(3.0 g, 0.051 mol), prepared by CH$_3$SIHCl$_2$ ammonolysis in THF solution, was added into the flask by syringe. A vigorous reaction occurred and a large amount of H$_2$ gas was evolved which was vented out of the flask through an oil bubbler. After the addition was finished, the reaction mixture was stirred at room temperature for 2 hours. To the living polymer solution, 3.0 g (0.05 mol of (CH$_3$Si(H)O) unit) of [CH$_3$Si(H)O]$_n$ was added slowly, dropwise, by syringe. (Caution: fast addition of [CH$_3$Si(H)O]$_n$ will produce an insoluble polymer.) Reaction occurred immediately with a small amount of gas evolution. The resulting clear solution was stirred at room temperature for 20 minutes and 0.5 ml (7.9 mmol) of CH$_3$I was added. The solvent was removed by trap-to-trap distillation. The residue was treated with 80 ml of hexane and the hexane-insoluble residue removed by centrifugation. The hexane was removed from the supernatant solution by trap-to-trap distillation, leaving 5.0 g (83% yield by weight) of a white solid. The polymer is very soluble in hexane, benzene, and THF.

Average Molecular Weight (cryoscopic in benzene): 1700 g/mol $^1$H NMR (90 MHz, C$_6$D$_6$)δ 5.10 (broad, SiH, 1 H) 1.22, 0.88 (SiCH$_3$NH) 0.19 (broad, SiCH$_3$, 10H, for the total area of SiCH$_3$ and SiCH$_3$NH)

IR (neat, cm$^{-1}$): 3421(m), 2976(s), 2941(s), 2884(m), 2871(sh), 2134(m), 1460(w, broad) 1413(w), 1270(s), 1255(s), 1115–1205 (s, broad), 950–1020 (s, broad), 880–910 (s, broad), 772(s)

Figure 2:
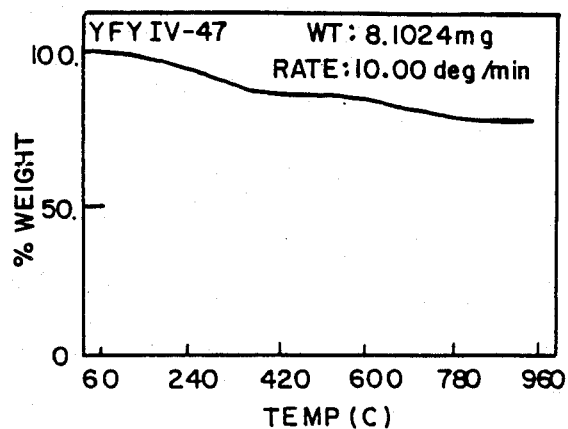
FIG. 2 is a TGA curve of a polymer formed by adding already preformed polysilylamide to cyclic polysiloxane (IV-47).

TGA: 78% yield of a black ceramic solid (See FIG. 2).

T$_½$*=380° C.

T$_½$*=temperature at which one-half of weight loss has occurred.

Anal. Found: C, 21.08; H, 6.01; N, 14.48; 0, 17.26; Si, 39.75%. Large scale pyrolysis (to 10000° C.) of the sample under Ar gave an 80% yield of a black ceramic solid.

Anal. Found: C, 11.53; N, 14.77; 0, 21.91; Si, 50.21%. From these data one may calculate the following composition:** 1 SiC+0.84 Si$_3$N$_4$+2.17 SiO$_2$+2.0 C.

The compositions are expressed in terms of the binary silicon compounds, but it should be understood that other combinations, e.g., silicon oxynitrides, are possible.

Pyrolysis under NH$_3$: (25°–1000° C.;100° C. per hour) Pyrolysis of 1.3 g of the sample in a stream of NH$_3$ gave a 78.5% yield of a white ceramic solid which contained only 0.48%

C.

2. [CH$_3$Si(H)O]$_n$/[CH$_3$SiHNH]$_m$ in 5:1 Weight Ratio (IV-48)

According to the procedure described above, the reaction between 0.1 g (2.50 mmol) KH and 1.0 g (0.017 mol) (CH$_3$SiHNH)$_m$ (prepared in THF solution) in 150 ml of THF was carried out under nitrogen. To the living polymer solution thus formed 5.0 g of [CH$_3$Si(H)O]$_n$ cyclics was added slowly by syringe. Reaction occurred immediately with a small amount of gas evolution. The resulting solution was stirred at room temperature for 20 minutes. To the reaction mixture was added 0.5 ml (7.9 mmol) of CH$_3$I. Work-up as described in the previous experiment left 4.8 g (80% yield by weight) of a white solid. The polymer is very soluble in hexane, benzene, and THF.

Average Molecular Weight (cryoscopic in benzene): 2400 g/mol $^1$H NMR (90 MHz, C$_6$D$_6$):δ5.10 (broad, Site,uns/H/ , 1 H) 1.22, 0.88 (SiCH$_3$NH) 0.21 (broad, SiCH$_3$, 14.6 H, for the total area of SiCH$_3$ and SiCH$_3$NH)

Figure 3:
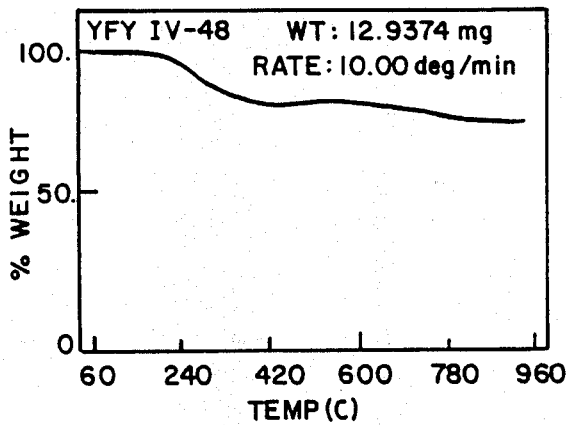
FIG. 3 is a TGA curve of a polymer formed by adding already preformed polysilylamide to cyclic polysiloxane (IV-48).

TGA: 76% yield of a black ceramic solid (See FIG. 3). T$_½$=330° C.

Anal. Found: C, 18.87; H, 5.03; N, 5.24; O, 30.09; Si, 41.15%.

3. [CH$_3$Si(H)O]$_n$/[CH$_3$SiHNH]$_m$ in 1:1 weight ratio (5 mol % KH, (Graft Procedure) (TT-2-33)

In a dry box, a 250 ml round-bottomed flask equipped with a stir-bar, reflux condenser, and a serum cap was charged with 0.1 g (2.50 mmol) of KH (4.9 mol %, based on (CH$_3$SiHNH)$_m$). THF (50 ml) was added to suspend the KH. (CH$_3$SiHNH)$_m$(3.0 g, 0.051 mol in 40 ml of THF), prepared by CH$_3$SlHCl$_2$ ammonolysis in diethyl ether solution, was cannulated slowly into the reaction flask. A vigorous reaction occurred and a large amount of H$_2$ gas was evolved which was vented out of the flask through an oil bubbler. Once the addition was completed, the reaction mixture was stirred at room temperature for 2 hours. To the living polymer solution, 3.0 g (0.05 mol of (CH$_3$Si(H)O) unit) of [CH$_3$Si(H)O]$_n$ cyclics in 40 ml of THF was slowly added by cannula. Reaction occurred immediately; a small quantity of gas was evolved. The resulting clear solution was stirred at room temperature for 30 minutes and 0.5 ml (7.9 mmol) of CH$_3$I was added by syringe. The solvent was removed by trap-to-trap distillation. To the residue was added 80 ml of hexane. Centrifugation separated insolubles, and the clear supernatant solution was evaporated (trap-to-trap distillation), leaving 4.63 g (77% yield by weight) of a white powder. The polymer is soluble in hexane, benzene and THF.

Average Molecular Weight (cryoscopic in benzene): 1090 g/mol $^1$H NMR (90 MHz, C$_6$D$_6$): δ5.10, 4.93 (broad, SiH, 1 H) 1.07 (SiCH$_3$NH) 0.23 (broad, SiCH$_3$, 10 H for the total area of SiCH$_3$ and SiCH$_3$NH)

IR (neat, cm$^{-1}$) 3385(w), 2963(s), 2940(m), 2920(m,sh), 2881(w), 2124(s), 1462(vw), 1412(w), 1262(s), 1110–1155 (s, broad), 960–1020 (s, broad) 880–920 (s, broad), 768(s)

Figure 4:
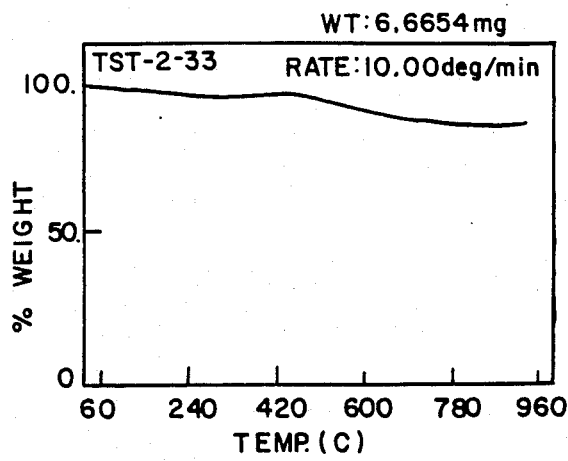
FIG. 4 is a TGA curve of a polymer formed by adding already preformed polysilylamide to cyclic polysiloxane (TT-2-33).

TGA: 87% yield of a black ceramic (See FIG. 4).

Anal. Found: C, 21.13; H, 6.27; N, 15.17; O, 9.92; Si, 47.51. Large scale pyrolysis of the sample under Ar (25°–1000° C., 10° C./minute) gave an 81% yield of a black ceramic.

Anal. Found: C, 13.43; H, 0.05; N, 19.62; O, 11.75; Si, 55.15. From these data one may calculate the following composition: 1 SiC+0.7 Si$_3$N$_4$+0.35 SiO$_2$+1.2 C.

Pyrolysis under NH$_3$: (25°–1000° C., 100° C./hour) Pyrolysis of 0.46 g of the sample under NH$_3$ yielded 0.38 g (83% yield by weight) of a white ceramic solid.

4. [CH$_3$Si(H)O]$_n$/[CH$_3$SiHNH]$_m$ in 1:1 weight ratio (10 mol % KH, (Graft Procedure) (TT-2-49)

According to the procedure described previously, the reaction between 0.2 g (5.00 mmol) KH (10.0 mol % based on (CH$_3$SiHNH)$_m$ and 3.0 g (0.051 mol)(CH$_3$SiHNH)$_m$ (prepared in diethyl ether solution) in 100 ml of THF was carried out under nitrogen. To the living polymer solution 3.0 g of [CH$_3$Si(H)O]$_n$ cyclics in 50 ml THF was added slowly by cannula. Reaction occurred immediately; a very small quantity of gas was evolved. The resulting solution was stirred at room temperature for 30 minutes and 0.5 ml (7.9 mmol) of CH$_3$I was added by syringe. Workup as described in the previous experiment left 4.56 g (76% yield by weight) of a white powder. The polymer is soluble in hexane, benzene and THF.

Average Molecular Weight (cryoscopic in benzene): 1020 g/mol $^1$H NMR (90 MHz, C$_6$D$_6$): δ5.22 (broad, s, SiH, 1 H) 2.48 (NCH$_3$, 0.2 H) 1.20 (SiCH$_3$NH) 0.20 (broad, SiCH$_3$, 9.5 H for total area of SiCH$_3$ and SiCH$_3$NH)

Figure 5:
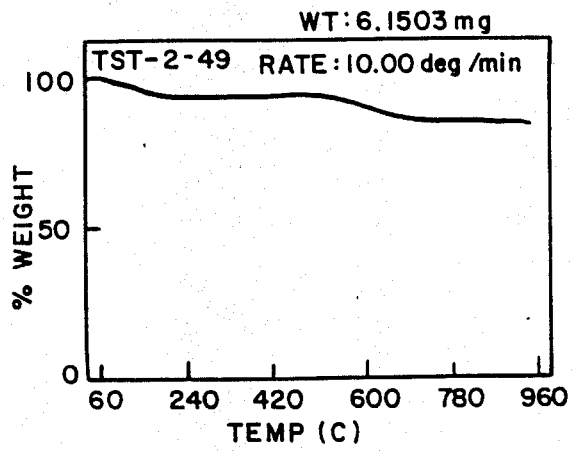
FIG. 5 is a TGA curve of a polymer formed by adding already preformed polysilylamide to cyclic polysiloxane (TT-2-49).

TGA: 86% yield of a black ceramic (See FIG. 5).

5. [CH$_3$Si(H)O]$_n$/[CH$_3$SiHNH]$_n$ in 1:1 weight ratio (15 mol % KH, (Graft Procedure) (TT-2-13)

According to the procedure described previously, the reaction between 0.1 g (2.50 mmol) KH (15 mol % based on (CH$_3$SiHNH)$_m$) and 1.0 g (0.017 mol) (CH$_3$SiHNH)$_m$ (prepared in diethyl ether solution) in 25 ml of THF was carried out under nitrogen. To the living polymer solution, 1.0 g of [CH$_3$SiHO]$_n$ cyclics in 20 ml THF was added slowly by cannula. A reaction occurred immediately. The resulting solution was stirred at room temperature for 30 min. and 0.5 ml (7.9 mmol) of CH$_3$I was added by syringe. Work up as described in the previous experiments left 1.91 g (95.6% yield by weight) of a white powder. The polymer is soluble in hexane, benzene and THF.

Average Molecular Weight (cryoscopic in benzene): 1500 g/mol $^1$H NMR (90 MHz, C$_6$D$_6$): δ5.20 (broad, SiH, 1 H) 2.48 (NCH$_3$, 0.4H) 1.22, 0.91 (SiCH$_3$NH) 0.27, 0.21 (broad, SiCH$_3$, 13 H for total area of SiCH$_3$ and SiCH$_3$NH)

Figure 6:
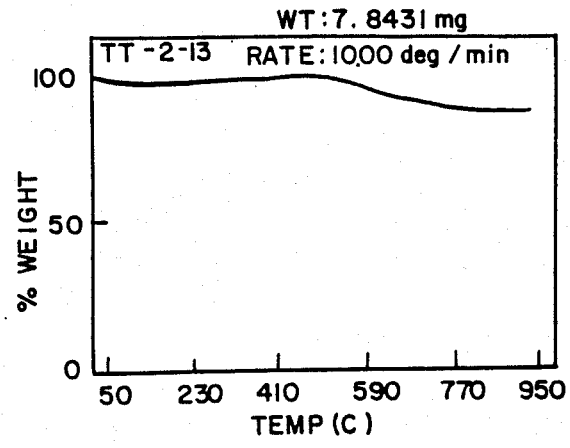
FIG. 6 is a TGA curve of a polymer formed by adding already preformed polysilylamide to cyclic polysiloxane (TT-2-13).

TGA: 86% yield of a black ceramic (See FIG. 6).
(sealed vacuum capillary): softens at 280° C.; does not melt up to 300° C.

Anal. Found: C, 28.46; H, 6.09; N, 14.40; O, 6.93; Si, 44.86%

6. [CH$_3$Si(H)O]$_n$/[CH$_3$SiHNH]$_m$ in 5:1 weight ratio (TT-2-36)

According to the procedure outlined previously, the reaction between 0.05 g (1.25 mmol) KH (4.6 mol % based on (CH$_3$SiHNH)$_m$, and 1.55 g (0.27 mol) (CH$_3$SiHNH)$_m$ (prepared in diethyl ether solution) in 100 ml of THF was carried out under nitrogen. To the living polymer solution 7.76 g of [CH$_3$Si(H)O]$_n$ cyclics in 50 ml THF was added slowly by cannula. A reaction occurred immediately with a small amount of gas evolved. The resulting solution was stirred at room temperature for 30 minutes and 0.5 ml (7.9 mmol) of CH$_3$I was added by syringe. Work up as described in the previous experiments left 5.83 g (63% yield by weight) of a white powder. This polymer is soluble in hexane, benzene and THF.

Average Molecular Weight (cryoscopic in benzene): 1490 g/mol

Figure 7:
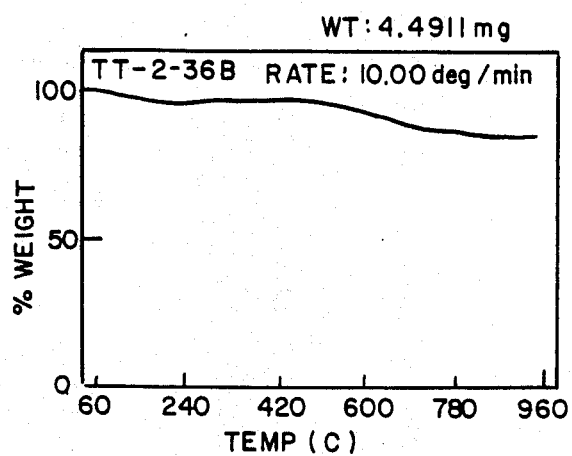
FIG. 7 is a TGA curve of a polymer formed by adding already preformed polysilylamide to cyclic polysiloxone (TT-2-36).

TGA: 85% yield of a black ceramic (See FIG. 7). mp (sealed vacuum capillary): does not melt up to 350° C.

Anal. Found: C, 19.67; H, 5.15; N, 5.76; O, 25.40; Si, 44.02%. Large scale pyrolysis of the sample under Ar (25°–1000° C., 10° C./minute) gave an 83% yield of a black ceramic.

Anal C, 13.40; H, 0.03; N, 7.29; O, 19.72; Si, 50.85%. From these data one may calculate the following composition:

1 SiC+0.16 Si$_3$N$_4$+0.76 SiO$_2$+0.39 C.

Pyrolysis under NH$_3$: (25°–100° C., 100° C./hour) Pyrolysis of a 0.83 g of the sample under NH$_3$ yielded 0.68 g (82% yield by weight) of a white ceramic solid.

D. Reaction of a Mixture of Cyclic [CH$_3$SiHNH]$_m$ and Cyclic [CH$_3$Si(H)O]$_n$ with KH Catalyst ("In-Situ Procedure")

1. [CH$_3$Si(H)O]$_n$/[CH$_3$SiHNH]$_m$ in 1:1 weight ratio (IV-43)

In a dry box, a 250 ml round-bottomed flask equipped with a stir-bar, reflux condenser, and a serum cap was charged with 0.1 g of KH (2.50 mmol). THF (100 ml) was added to suspend the KH. A separate 250 ml flask was charged with 4.0 g of (CH$_3$SiHNH)$_m$ (0.085 mol), prepared by ammonolysis of CH$_3$SiHCl$_2$, in THF solution, and 3.6 g of [CH$_3$Si(H)O]$_n$, and 50 ml of THF. This solution was transferred by cannula into the KH suspension in THF. The reaction mixture gradually turned clear and hydrogen gas slowly was evolved. The resulting solution was stirred at room temperature for 4 hours and then 0.5 ml (7.9 mmol) of CH$_3$I was added. The solvent was removed by trap-to-trap distillation. The residual solid was treated with 80 ml of hexane and the insoluble residue removed by centrifugation. The clear, colorless supernatant layer was transferred via cannula into a weighed 100 ml round-bottomed flask. The hexane was removed by trap-to-trap distillation leaving 6.7 g (88% yield by weight) of a white powder. The latter is soluble in THF, benzene, and hexane.

Average Molecular Weight (cryoscopic in benzene): 1670 g/mol $^1$H NMR (90 MHz, C$_6$D$_6$): δ5.08, 4.70 (broad, SiH, 1 H) 1.21, 0.87 (SiCH$_3$NH) 0.25 (broad, SiCH$_3$,9H for the total area of SiCH$_3$ and SiCH$_3$NH)

Figure 8:
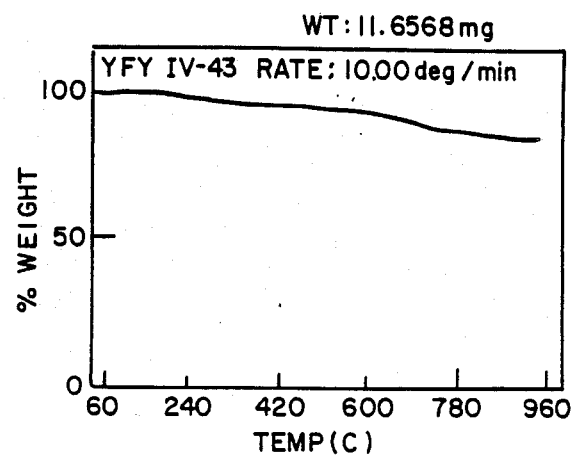
FIG. 8 is a TGA curve of a polymer formed with cyclic polysiloxane and polysilylamide generated in situ (IV-43).

TGA: 84% yield of a black ceramic solid (See FIG. 8). T$_{\frac{1}{2}}$=510° C.

Anal. Found: C, 19.82; H, 5.86; N, 10.07; O, 21.05; Si, 43.85%. Large scale pyrolysis of the sample under Ar gave a 73% yield of a black ceramic solid (25°–1000° C., 10° C./minute)

Anal. Found: C, 13.42; N, 17.80; O, 17.48; Si, 50.59% From these data one may calculate the following composition:

1 SiC + 1.03 Si$_3$N$_4$ + 1.8 SiO$_2$ + 2.63C.

2. [CH$_3$Si(H)O]$_n$/[CH$_3$SiHNH]$_m$ in 1:1 weight ratio (10 mol % KH) (TT-2-55)

According to the procedure described above, the reaction between 0.2 g (5.00 mmol) KH (10.0 mol % based on (CH$_3$SiHNH)$_m$), 3.0 g (0.051 mol) (CH$_3$SiHNH)$_m$ (prepared by CH$_3$SiHCl$_2$ ammonolysis in diethyl ether solution), and 3.0 g [CH$_3$Si(H)O]$_n$ cyclics together in 150 ml of THF was carried out under nitrogen. The resulting reaction mixture turned clear with slow gas evolution. The solution was stirred at room temperature for 4 hours and then 0.5 ml (7.9 mmol) of CH$_3$I was added. Workup as described in the previous experiment left 4.98 g (83% yield by weight) of a white powder. The polymer is soluble in hexane, benzene and THF.

Average Molecular Weight (cryoscopic in benzene): 710 g/mol $^1$H NMR (250 MHz, C$_6$D$_6$): δ5.17, 4.78 (broad, SiH, 1H); 2.46 (NCH$_3$, 0.44H); 0.89 (SiCH$_3$NH); (SiCH$_3$NH); 0.28 (broad, SiCH$_3$ 12.1 H for total area of SiCH$_3$ and SiCH$_3$NH)

TGA 82% yield of a black ceramic.

mp (sealed vacuum capillary): melts at 85°–100° C.

3 [CH$_3$Si(H)O]$_n$/[CH$_3$SiHNH]$_m$ in 1:1 weight ratio (15 mol % KH) (TT-2-14)

According to the procedure described previously, the reaction between 0.1 g (2.50 mmol) KH (15 mol % based on (CH$_3$SiHNH)$_m$), 1.0 g (0.017 mol) (CH$_3$SiHNH)$_m$ (prepared in diethyl ether solution), and 1.0 g [CH$_3$Si(H)O]$_n$ cyclics together in 50 ml of THF was carried out under nitrogen. The resulting reaction mixture gradually turned clear with slow gas evolution. After the solution had been stirred at room temperature for 4 hours, 0.5 ml (7.9 mmol) of CH$_3$I was added by syringe. Work up as described in the previous experiments left 1.74 g (87% yield by weight) of a white powder. The polymer is soluble in hexane, benzene and THF.

Average Molecular Weight (cryoscopic in benzene): 1760 g/mol $^1$H NMR (90 MHz, C$_6$D$_6$): δ5.21 (broad, SiH, 1 H) 2.48 (NCH$_3$, 0.7H) 1.24 (SiCH$_3$NH) 0.27 (broad, SiCH$_3$, 14 H for the total area of SiCH$_3$ and SiCH$_3$NH)

Figure 9:
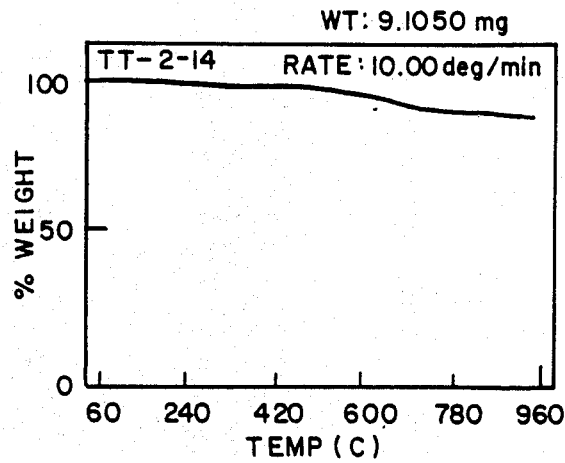
FIG. 9 is a TGA curve of a polymer formed with cyclic polysiloxane and polysilylamide generated in situ (TT-2-14).

TGA: 88% yield of a black ceramic (See FIG. 9).

mp (sealed vacuum capillary): softens at 250° C.; does not melt up to 350° C.

4. [CH$_3$Si(H)O]$_n$/[CH$_3$SiHNH]$_m$ in 5:1 weight ratio (TT-2-38)

According to the procedure outlined previously, the reaction between 0.05 g (1.25 mmol) KH (4.6 mol % based on (CH$_3$SiHNH)$_m$, 1.55 g (0.027 mol) (CH$_3$SiHNH)$_m$ (prepared in diethyl ether soluiton), and 7.95 g [CH$_3$Si(H)O]$_n$ cyclics in 50 ml THF was carried out under nitrogen. The resulting reaction mixture gradually turned clear with slow H$_2$ evolution. After the solution was stirred at room temperature for 4 hours, 0.5 ml (7.9 mmol) of CH$_3$I was added by syringe. Work up as described in the previous experiments left 6.49 g (69% yield by weight) of a viscous oil. The polymer is soluble in hexane, benzene and THF.

Average Molecular Weight (cryoscopic in benzene): 760 g/mol $^1$H NMR (90 MHz, C$_6$D$_6$): δ4.97 (broad, SiH, 1 H) 0.23 (broad, SiCH$_3$, 10.8 H)

TGA: 61% yield of a black ceramic.

E. Reactions of [CH$_3$SiHNH]$_a$(CH$_3$SiN)$_b$(CH$_3$SiHNK)$_c$]$_m$Living Polymer with Polymethylhydrogensiloxane, [CH$_3$Si(H)O]$_n$ (PS-122).

1. [CH$_3$Si(H)O]$_n$/[CH$_3$SiHNH]$_m$ in 1:1 weight ratio (Graft Procedure) (IV-45)

In a dry box, a 250 ml round-bottomed flask equipped with a stir-bar, reflux condenser, and a serum cap was charged with 0.1 g (2.50 mmol) of KH. THF (50 ml) was added to suspend the KH. (CH$_3$SiHNH)$_m$ (4.0 g, 0.068 mol), prepared by CH$_3$SiHCl$_2$ ammonolysis in THF solution, was added into the flask by syringe. A vigorous reaciton occurred and a large amount of H$_2$ gas was evolved which was vented out of the flask through an oil bubbler. After the addition was finished, the reaction mixture was stirred at room temperature for 2 hours. To the living polymer solution, 3.0 g of PS-122 was added dropwise by syringe. Reaction occurred immediately with a small amount of gas evolution. The resulting solution was stirred at room temperature for 20 minutes and 0.5 ml (7.9 mmol) of CH$_3$I was added. The solvent was removed by trap-to-trap distillation. The residual solid was treated with 80 ml of hexane and the insoluble residue removed by centrifugation. The hexane was removed from the supernatant solution by trap-to-trap distillation, leaving 5.9 g (84% yield by weight) of a white solid. The polymer is very soluble in hexane, benzene, and THF.

Average Molecular Weight (cryoscopic in benzene): 1540 g/mol $^1$H NMR (90 MHz, C$_6$D$_6$) δ5.14 (broad, SiH, 1 H) 1.21, 0.87 (SiCH$_3$NH) 0.18 (broad, SiCH$_3$, 10.6 H for the total area of SiCH$_3$ and SiCH$_3$NH)

Figure 10:
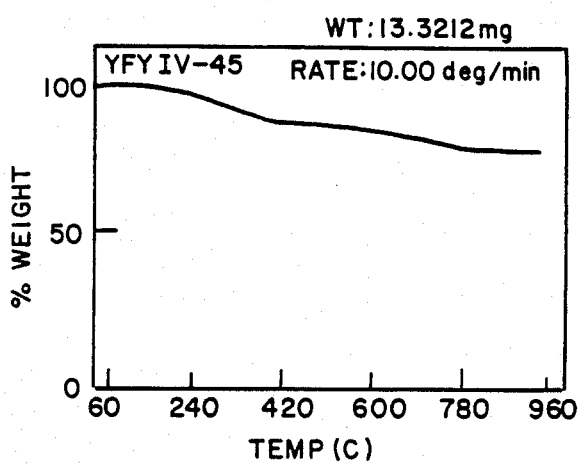
FIG. 10 is a TGA curve of a polymer formed by adding already preformed polysilylamide to linear polysiloxane (IV-45).

TGA: 77% yield of a black ceramic solid (See FIG. 10). T$_{\frac{1}{2}}$=400° C.

Anal. Found: C, 20.95; H, 5.77; N, 11.91; O, 17.92; Si, 43.10%. Large scale pyrolysis of the sample under Ar gave a 73% yield of a black ceramic solid (25–°1000° C., 10° C./minute).

Anal. Found: C, 11.37; N, 17.20; O, 20.66; Si, 49.58%. Calculated composition, in terms of binary silicon compounds: 0.5 SiO$_2$, 0.21 SiC, 0.32 Si$_3$N$_4$, 0.8 C.

2. [CH₃Si(H)O]ₙ, (PS-122)/[CH₃SiHNH]ₘ in 1:1 weight ratio (Graft Procedure) (TT-2-27)

In a dry box, a 250 ml round-bottomed flask equipped with a stir bar, reflux condenser, and a serum cap was charged with 0.1 g (2.50 mmol) of KH. THF (50 ml) was added to suspend the KH. (CH₃SiHNH)ₘ (3.0 g, 0.051 mol in 40 ml of THF), prepared by CH₃SiHCl₂ ammonolysis in diethyl ether solution, was cannulated slowly into the reaction flask. A vigorous reaction occurred and a large amount of H₂ gas was evolved and vented out of the flask. Once the addition was complete the reaction mixture was stirred at room temperature for 2 hours. To the living polymer solution, 3.0 g of [CH₃Si(H)O]ₙ (PS-122) in 50 ml of THF was slowly added, and a small amount of gas was evolved. The resulting solution was stirred at room temperature for 1 hour and 0.5 ml (7.9 mmol) of CH₃I was added. The solvent was removed by trap-to-trap distillation. To the residue was added 80 ml of hexane and the mixture was centrifuged. The clear supernatant solution was evaporated (trap-to-trap distillation), leaving 5.04 g (84% yield by weight) of a white powder. The polymer is soluble in hexane, benzene and THF.

Average Molecular Weight (cryoscopic in benzene): 885 g/mol $^1$H NMR (90 MHz, C₆D₆): ε5.19 (broad, SiH, 1 H) 2.48 (NCH₃, 0.1 H) 1.21, 0.97 (SiCH₃NH) 0.27 (broad, SiCH₃, 12.2 H, for the total area of SiCH₃ and SiCH₃NH)

Figure 11:
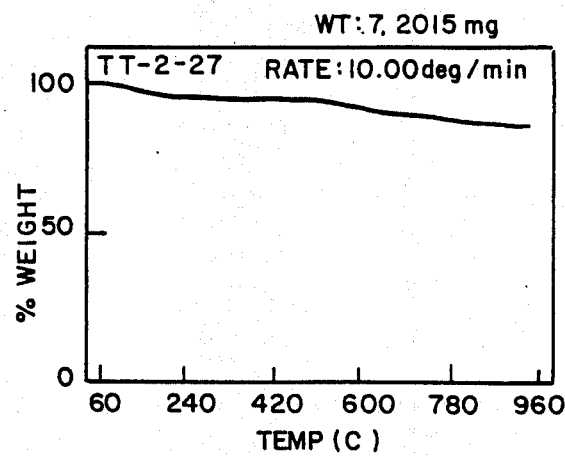
FIG. 11 is a TGA curve of a polymer formed by adding already preformed polysilylamide to cyclic polysiloxane (TT-2-27).

TGA: 86% yield of a black ceramic (See FIG. 11).

mp (sealed vacuum capillary): softens at 250° C.; does not melt up to 350° C.

Anal. Found: C, 21.98; H, 6.33; N, 15.23; O, 10.95; Si, 45.51%. Large scale pyrolysis of a sample under Ar (25–1000° C., 10° C./minute) gave an 80% yield of a black ceramic.

Anal. Found: C, 16.55; H, 0.24; N, 24.52; O, 4,92; Si, 54.00%. From these data one may calculate the following composition: 1 SiC+1.12 Si₃N₄+0.4 SiO₂+2.5 C.

3. [CH₃Si(H)O]ₙ/[CH₃SiHNH]ₘ in 1:1 weight ratio (In-Situ Procedure) (IV-51).

In a dry box, a 100 ml round-bottomed flask equipped with a stir-bar, reflux condenser, and a serum cap was charged with 0.1 g of KH (2.50 mmol). THF (10 ml) was added to suspend the KH. A separate 250 ml flask was charged with 3.0 g of (CH₃SiHNH)ₘ, prepared by ammonolysis of CH₃SiHCl₂ in THF solution, and 3.0 g of [CH₃Si(H))]ₙ, (PS-122) and 60 ml of THF. The mixed polymer solution was transferred by cannula into the KH suspension in THF. The reaction mixture gradually turned clear and hydrogen gas was slowly evolved. The resulting solution was stirred at room temperature for 1.5 hours and 0.5 ml (7.9 mmol) of CH₃I was added. The solvent was removed by trap-to-trap distillation. The remaining solid was shaken with 80 ml of hexane and the insoluble residue removed by centrifugation. The clear, colorless supernatant layer was transferred via cannula into a weighed 100 ml round-bottomed flask. The hexane was removed by trap-to-trap distillation leaving 5.7 g (95% yield by weight) of a white powder, soluble in THF, benzene, and hexane.

Average Molecular Weight (cryoscopic in benzene): 1740 g/mol $^1$H NMR (90 MHz, C₆D₆): δ5.07, 4.66 (broad, SiH, 1 H) 1.22, 0.89 (SiCH₃NH) 0.25 (broad, SiCH₃, 10 H, for the total area of SiCH₃ and SiCH₃NH)

IR (neat cm$^{-1}$): 3418(m), 2961(s), 2910(m), 2860(w) 2122(s), 1452(w), 1412(w), 1274(s), 1267(s,sh), 1110–1140 (s,broad), 1042 (s, broad), 950–965 (s, broad) 904–913 (s, broad), 772(s)

Figure 12:
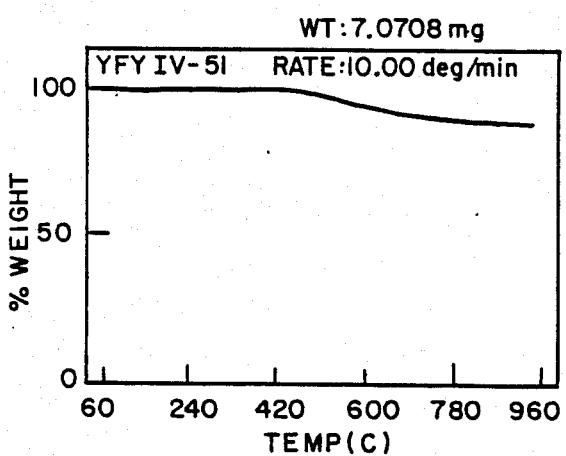
FIG. 12 is a TGA curve of a polymer formed with linear polysiloxane and polysilyamide generated in situ (IV-51).

TGA: 88% yield of black ceramic solid (See FIG. 12). T½=640° C.

Anal. Found: C, 20.22; H, 5.95; N, 12.79; O, 17.22; Si, 43.48%.

4. [CH₃Si(H)O]ₙ (PS-122)/[CH₃SiHNH]ₘ in 1:1 weight ratio (In Situ Procedure) (TT-2-26)

In a dry box, a 250 ml round-bottomed flask equipped with a stir bar, reflux condenser, and a serum cap was charged with 0.1 g (2.50 mmol) of KH. THF (50 ml) was added to suspend the KH. A separate 250 ml flask was charged with 3.0 g of (CH₃SiHNH)ₘ (0.051 mol), prepared by ammonolysis of CH₃SiHCl₂ in diethyl ether solution, and 3.0 g of [CH₃Si(H)O]ₙ (PS-122) along with 70 ml of THF. The mixed polymer solution was transferred by cannula into the KH suspension in THF. The reaction mixture gradually turned clear and a small quantity of gas was evolved. The resulting solution was stirred at room temperature for 4 hours and 0.5 ml (7.9 mmol) of CH₃I was then added. The solvent was removed by trap-to-trap distillation. To the residue was added 80 ml of hexane and the mixture was centrifuged. The clear supernatant solution was evaporated (trap-to-trap distillation), leaving 4.44 g (74% yield by weight) of a white powder. The polymer is soluble in hexane, benzene and THF.

Averaoe Molecular Weight (cryoscopic in benzene): 840 g/mol $^1$H NMR (90 MHz, C₆D₆): δ5.27 (broad, SiH, 1 H), 2.52 (NCH₃, 0.2 H) 1.21, 0.89 (SiCH₃NH) 0.21 (broad, SiCH₃, 10 H for total area of SiCH₃ and SiCH₃NH)

IR (neat, cm$^{-1}$) 3396(m), 2973(s), 2948(m), 2910(m,sh), 2883(m), 2122(s), 1475(vs), 1411(w), 1262–1273(s), 1060–1205(s, broad), 940–980(s, broad), 905(s, broad), 762(s)

TGA: 79% yield of a black ceramic.

mp (sealed capillary): melts 100°–1150° C.

F. Reactions of [(CH₃SiHNH)ₐ(CH₃SiN)ᵦ(CH₃SiHNK)ᵧ]ₘ Living Polymer with Mixed Siloxane [(CH₃Si(H)O)ᵣ((CH₃)₂SiO)ₛ]ₙ

1. [(CH₃Si(H)O)ᵣ((CH₃)₂SiO)ₛ]ₙ/[CH₃SiHNH]ₘ in 1:1 weight ratio (Graft Procedure)

a. IV-49

In a dry box, a 250 ml round-bottomed flask equipped with a stir-bar, reflux condenser, and a serum cap was charged with 0.1 g (2.50 mmol) of KH. THF (160 ml) was added to suspend the KH. (CH₃SiHNH)ₘ(3.0 g, 0.051 mol), prepared by CH₃SiHCl₂ ammonolysis in THF solution, was added into the flask by syringe. A vigorous reaction occurred and a large amount of H₂ gas was evolved which was vented out of the flask through an oil bubbler. After the addition was finished, the reaction mixture was stirred at room temperature for 2 hours. To the living polymer solution 3.0 g of mixed siloxane, [(CH₃Si(H)O)ᵣ((CH₃)₂SiO)ₛ]ₙ (r+s=1) was added dropwise by syringe. Reaction occurred immediately with a small amount of gas evolution. The resulting clear solution was stirred at room temperature for 20 minutes and 0.5 ml (7.9 mmol) of CH₃I was added. The solvent was removed by trap-to-trap distillation. The residue was shaken with 80 ml of hexane and the hexane-insoluble residue removed by centrifugation. The hexane was removed from the supernatant solution by trap-to-trap distillation, leaving 4.8 g (80% yield by weight) of a white solid. The polymer is very soluble in hexane, benzene, and THF.

Average Molecular Weight (cryoscopic in benzene): 1280 g/mol $^1$H NMR (90 MHz, $C_6D_6$): δ5.13 (broad, SiH, 1 H) 1.22, 0.88 (SiCH$_3$NH) 0.22, 0.19 (broad, SiCH$_3$, 10 H for the total area of SiCH$_3$ and SiCH$_3$NH)

IR (neat, cm$^{-1}$) 3426(m), 2972(s), 2943(s), 2885(m), 2867(sh), 2133(s), 1467(w), 1414(w), 1250-1276(s, broad), 760-1205(s, broad)

Figure 13:
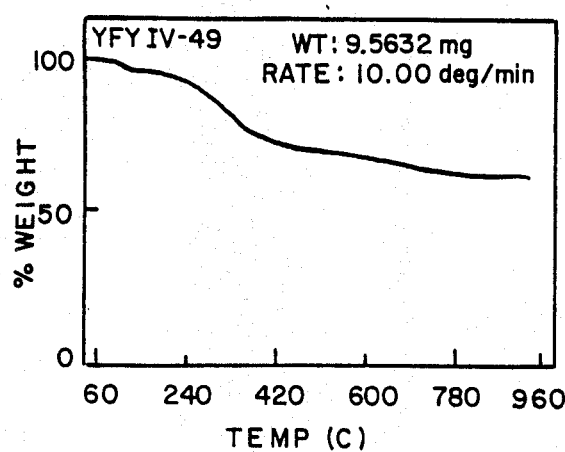
FIG. 13 is a TGA curve of a polymer formed by adding already preformed polysilylamide to mixed siloxane (IV-49).

TGA: 62% yield of a black ceramic solid (See FIG. 13) $T_{\frac{1}{2}}=350°$ C.

Anal. Found: C, 24.67; H, 6.41; N, 16.53; O, 10.02; Si, 42.79% b. TT-2-44

In a dry box, a 250 ml round-bottomed flask equipped with a stir-bar, reflux condenser, and a serum cap was charged with 0.1 g (2.50 mmol) of KH. THF (50 ml) was added to suspend the KH. (CH$_3$SiHNH)$_m$ (3.0 g, 0.51 mol in 40 ml of THF), prepared by CH$_3$SiHCl$_2$ ammonolysis in diethyl ether solution, was cannulated slowly into the reaction flask. A vigorous reaction occurred and a large amount of H$_2$ gas was evolved and vented out of the flask. Once the addition was complete the reaction mixture was stirred at room temperature for 2 hours. To the living polymer solution, 3.0 g of mixed siloxane [(CH$_3$Si(H)O)$_r$((CH$_3$)$_2$SiO)$_s$]$_n$ in 50 ml of THF was slowly added; and a small amount of gas was evolved. The resulting solution was stirred at room temperature for 1 hour and 0.5 ml (7.9 mmol) of CH$_3$I was added. The solvent was removed by trap-to-trap distillation. To the residue was added 80 ml of hexane and the mixture was centrifuged. The clear supernatant solution was evaporated (trap-to-trap distillation), leaving 5.16 (86% yield by weight) of a white powder. The polymer is soluble in hexane, benzene and THF.

Average Molecular Weight (cryoscopic in benzene): 705 g/mol $^1$H NMR (90 MHz, $C_6D_6$): δ5.30 (broad, SiH, 1 H) 1.20 (SiCH$_3$NH) 0.24 (broad, SiCH$_3$, 11.1 H, for the total area of SiCH$_3$ and SiCH$_3$NH)

IR (neat, cm$^{-1}$): 3406(w), 2978(m), 2943(w,sh), 2918(w) 2123(m), 1414(vw), 1277(s,sh), 1264(s) 1080-1140(s, broad), 980-1025(s, broad) 897(s, broad), 796(s), 762(s)

TGA: (25-1000° C., 10° C./minute): 61% of a black ceramic.

mp (sealed vacuum capillary): melts 170°-180° C.

Pyrolysis under NH$_3$: (25°-1000° C., 100° C./hour) Pyrolysis of 4.0 g of the sample under NH$_3$ gave a 58% yield of a white ceramic.

Analysis indicated the presence of only 0.32% C.

2 [(CH$_3$Si(H)O)$_r$((CH$_3$)$_2$SiO)$_s$]$_n$/[CH$_3$SiHNH]$_m$ in 1:1 weight ratio (In-Situ Procedure)

a. IV-52

In a dry box, a 100 ml round-bottomed flask equipped with a stir-bar, reflux condenser, and a serum cap was charged with 0.1 g of KH (2.50 mmol). THF (10 ml) was added to suspend the KH. A separate 250 ml flask was charged with 3.0 g of (CH$_3$SiHNH)$_m$, prepared by ammonolysis of CH$_3$SiHCl$_2$ in THF solution, and 3.0 g of [(CH$_3$Si(H)O)$_r$((CH$_3$)$_2$SiO)$_s$]$_n$, and 60 ml of THF. The mixed polymer solution was transferred by cannula into the KH suspension in THF. The reaction mixture gradually turned clear and hydrogen gas was slowly evolved. The resulting solution was stirred at room temperature for 1.5 hours and 0.5 ml (7.9 mmol) of CH$_3$I was added. The solvent was removed by trap-to-trap distillation. The residue was extracted with 80 ml of hexane and the hexane-insoluble residue removed by centrifugation. The clear, colorless supernatant layer was transferred by cannula into a weighed 100 ml round-bottomed flask. The hexane was removed by trap-to-trap distillation leaving 5.7 g (95% yield by weight) of a white powder. The white powder is soluble in THF, benzene, and hexane.

Average Molecular Weight (cryoscopic in benzene): 1010 g/mol $^1$H NMR (90 MHz, $C_6D_6$): δ5.03, 4.66 (broad, SiH, 1 H) 1.17 (SiCH$_3$NH) 0.22, 0.16(broad, SiCH$_3$, 11 H, for the total area of SiCH$_3$ and SiCH$_3$NH)

Figure 14:
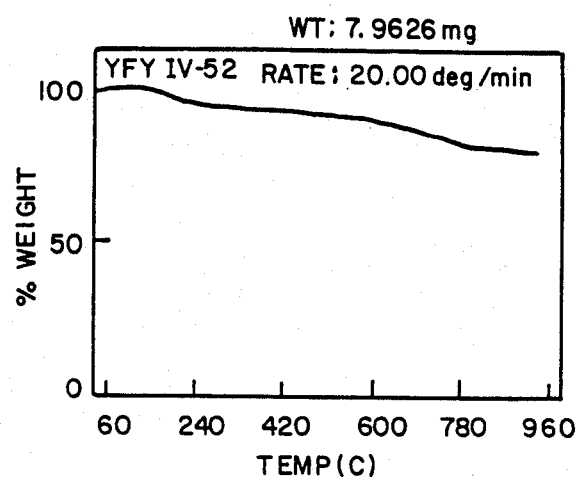
FIG. 14 is a TGA curve of a polymer formed with mixed polysiloxane and polysilylamide generated in situ (IV-52).

TGA: 80% yield of a black ceramic solid (See FIG. 14). $T_{\frac{1}{2}}=590°$ C.

Anal. Found: C, 22.57; H, 6.47; N, 12.81; O, 16.51; Si, 41.52%.

b. TT-2-45

In a dry box, a 250 ml round-bottomed flask equipped with a stir-bar, reflux condenser and a serum cap was charged with 0.1 g (2.50 mmol) of KH. THF (50 ml) was added to suspend the KH. A separate 250 ml flask was charged with 3.1 g of (CH$_3$SiHNH)$_m$ (0.053 mol), prepared by ammonolysis of CH$_3$SiHCl$_2$ in diethyl ether solution, and 3.1 g of mixed siloxane [(CH$_3$Si(H)O)$_r$((CH$_3$)$_2$SiO)$_s$]$_n$ along with 70 ml of THF. The mixed polymer solution was slowly transferred by cannula into the KH suspension in THF. As the reaction mixture gradually turned clear, a small quantity of gas was evolved, and vented out of the flask. The resulting solution was stirred at room temperature for 4 hours and 0.5 ml (7.9 mmol) of CH$_3$I was then added. The solvent was removed by trap-to-trap distillation. To the residue was added 80 ml of hexane and the mixture was centrifuged. The clear supernatant solution was evaporated (trap-to-trap distillation), leaving 5.02 g (81% yield by weight) of a white powder. The polymer is soluble in hexane, benzene and THF.

Average Molecular Weight (cryoscopic in benzene): 770 g/mol $^1$H NMR (90 MHz, $C_6D_6$): δ5.30 (broad, SiH, 1 H) 0.31(broad, SiCH$_3$, 11.8 H)

Figure 15:
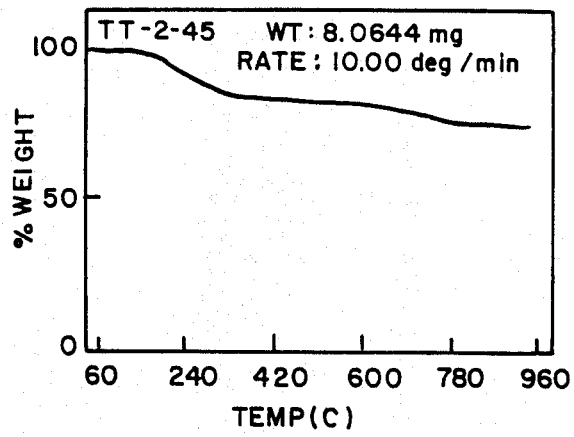
FIG. 15 is a TGA curve of a polymer formed by adding already preformed polysilylamide to cyclic polysiloxane (TT-2-45).

TGA: 75% yield of a black ceramic (See FIG. 15).

mp (sealed vacuum capillary): melts at 60°-70° C.

A 2.9 g sample of the polymer was pyrolyzed (to 1000° C.) under a stream of NH$_3$. Analysis of the white ceramic, produced in 65% yield, showed only 0.47% C. to be present.

G. Preparation of a Physical Mixture of [(CH$_3$SiHNH)$_a$(CH$_3$SiN)$_b$(CH$_3$SiHNCH$_3$)$_c$]$_m$ (2-19) and [CH$_3$Si(H)O]$_n$ (PS-122) in a 1:1 weight ratio (TT-2-62)

In a dry box, a 100 ml Schlenk type flask equipped with a stir-bar and a serum cap was charged with 1.0 g of [(CH$_3$SiHNH)$_a$(CH$_3$SiN)$_b$(CH$_3$SiHNCH$_3$)$_c$]$_n$ polymer. THF (40 ml) was added to dissolve the white powder. [CH$_3$Si(H)O]$_n$ (PS-122) (1.0 g) was added by syringe and the mixture was stirred for 3 hours at room temperature. The solvent was removed by trap-to-trap distillation, leaving a white, gummy solid.

Figure 16:
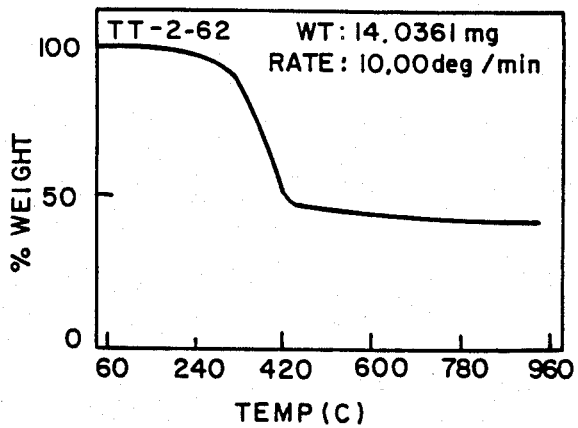
FIG. 16 is a TGA curve of a physical mixture of polysiloxane and polysilylamide (TT-2-62).

TGA: 42% yield of a black ceramic (See FIG. 16).

H. Preparation of Ceramic Bars a. The polymer (3.05 g, IV-47, Example C.1) was loaded into a 3.9 cm×1.3 cm×3.7 cm rectangular steel die and uniaxially pressed at 5000 lbs for 5 minutes. The polymer bar was then bagged and isostatically pressed at 40,000 psi for one minute. The sample was placed in the quartz tube furnace and pyrolyzed under argon to 1000° C., heating at 10° C./minute. A black ceramic foam was obtained with a loss of 21% of the original weight.

b. The polymer (2.58 g, IV-45, Example E.1) was loaded into a 3.9 cm×1.3 cm×3.7 cm rectangular steel die and uniaxially pressed at 5000 lbs for 5 minutes. The polymer bar was then bagged and isostatically pressed at 40,000 psi for one minute. The sample was placed in the quartz tube furnace and pyrolyzed under argon to 1000° C., heating at 10° C./minute. A black, rectangular shaped ceramic bar was obtained with a loss of 30% of the original weight.

c. The polymer (1.23 g, TT-2-45, Example F.2(b)) was loaded into a 3.9 cm×1.3 cm×3.7 cm rectangular steel die and uniaxially pressed at 5000 lbs for 5 minutes. The polymer bar was then bagged and isostatically pressed at 40,000 psi for one minute. The sample was placed in a quartz tube furnace and pyrolyzed under a stream of ammonia to 1000° C., heating at 100° C./hour. A white body (rectangular shape not retained) was obtained with 35% loss of the original weight.

d. The polymer (1.22 g, TT-2-49, Example C.4) was loaded into a 3.9 cm×1.3 cm×3.7 cm rectangular steel die and uniaxially pressed at 5000 lbs for 5 minutes. The polymer bar was then bagged and isostatically pressed at 40,000 psi for one minute. The sample was placed in a quartz tube furnace and pyrolyzed under ammonia to 1000° C., heating at 100° C./hour. A white rectangular shaped ceramic bar was obtained with a loss of 22% of the original weight.

This invention has been described in detail including the preferred embodiments thereof. However, it will be appreciated that those skilled in the art, upon consideration of this disclosure, may make modifications and improvements without departing from the spirit and scope of the invention as set forth in the claims.

We claim:

1. A method for preparing organosilicon polymers, wherein the method comprises:
   (a) admixing a poly(silylamide) in an organic solvent with a polysiloxane having a plurality of repeat units of the formula $[RSi(H)O]_n$ where R is a lower alkyl group having from 1 to about 6 carbon atoms, a cycloalkyl group having 3 to about 6 carbon atoms, a substituted or unsubstituted lower aryl group having from 6 to about 10 carbon atoms, and n is an integer 1 or greater; and
   (b) allowing the admixture of step (a) to react.

2. The method of claim 1 wherein said method further comprises quenching the reaction mixture of step (b) with a reactive electrophile.

3. The method of claim 2, wherein the poly(silylamide) has the formula $[(R^1SiHNH)_a(R^1SiN)_b(R^1SiHNM)_c]_m$, where $a+b+C=1$, $R^1$ is a lower alkyl group having from 1 to about 6 carbon atoms, a substituted or unsubstituted cycloalkyl group having from 3 to about 6 carbon atoms, a substituted or unsubstituted alkenyl group having from 2 to about 6 carbon atoms, a substituted or unsubstituted lower aryl group having from 6 to about 10 carbon atoms, a tri(lower)alkyl- or di(lower)alkylsilyl group or a di(lower)alkylamino group; M is an alkali metal or one-half equivalent of an alkaline earth metal; and m is an integer greater than 1.

4. The method of claim 1, wherein R is the lower alkyl group.

5. The method of claim 4, wherein R is $CH_3$.

6. The method of claim 3, wherein $R^1$ is the lower alkyl group.

7. The method of claim 6, wherein R is the lower alkyl group.

8. The method of claim 7, wherein both R and $R^1$ are $CH_3$.

9. The method of claim 1 wherein the weight ratio of polysiloxane: poly(silylamide) is from about 15:1 to 1:15.

10. The method of claim 3 wherein the ratio of polysiloxane to alkali metal poly(silylamide) is about 5:1 to 1:5.

11. The method of claim 10 wherein the ratio is about 1:1.

12. The method of claim 2, wherein the reactive electrophile has the formula E-X, wherein E is selected from the group consisting of lower alkyl and silyl groups and X is selected from the group consisting of halogens, sulfates and sulfonates.

13. The method of claim 12 wherein the reactive electrophile is selected from the group consisting of lower alkyl halides, lower alkyl sulfates, lower alkyl sulfonates, and halosilanes.

14. The method of claim 13 wherein the reactive electrophile is the lower alkyl halide.

15. The method of claim 14 wherein the lower alkyl halide is $CH_3I$.

16. The method of claim 13 wherein the halosilane is a chlorosilane.

17. A preceramic polymer formed by the method of claim 1.

18. A preceramic polymer formed by the method of claim 3.

19. A preceramic polymer formed by the method of claim 11.

20. The method of claim 1 wherein R is the lower aryl group.

21. A preceramic polymer formed by the method of claim 8.

22. A method for preparing an organosilicon polymer, wherein the method comprises:
   (a) generating an alkali metal poly (silylamide) in the presence of a polysiloxane having a plurality of repeat units of the formula:
   $[RSi(H)O]_n$, where n is an interger 1 or greater; R is a lower alkyl group having from 1 to about 6 carbon atoms, a lower cycloalkyl group having from 3 to about 6 carbon atoms, or a substituted or unsubstituted lower aryl group having from 6 to about 10 carbon atoms,
   wherein the poly(silylamide) is generated by reacting the ammonolysis product of an $R^1SiHX_2$, where $R^1$ is a lower alkyl group having from 1 to about 6 carbon atoms, a substituted or unsubstituted cycloalkyl group having 3 to about 6 carbon atoms, a substituted or unsubstituted alkenyl group having from 2 to about 6 carbon atoms, a substituted or unsubstituted lower aryl group having from 6 to about 10 carbon atoms, a tri(lower)alkyl- or di(lower)alkylsilyl group or a di(lower)alkylamino group and X is a halogen, in the presence of a basic catalyst capable of deprotonating the hydrogen from a nitrogen atom adjacent to a silicon atom to generate the poly(silylamide) in situ:

(b) allowing the in situ generated poly(silylamide) and the polysiloxane sufficient time to react with each other at room temperature; and (c) quenching the mixture with an organic halide or halosilane to produce the organosilicon preceramic polymer.

23. The method of claim 22 wherein the ratio of polysiloxane: in situ generated poly(silylamide) is from about 15:1 to 1:15.

24. The method of claim 23 wherein the ratio of polysiloxane: in situ generated poly(silylamide) is from about 5:1 to 1:5.

25. The method of claim 24 wherein the ratio of polysiloxane: in situ generated poly(silylamide) is about 1:1.

26. The method of claim 24 wherein R amd $R^1$ are each the lower alkyl groups.

27. The method of claim 24 wherein R and $R^1$ are $CH_3$.

28. The method of claim 25 wherein R and $R^1$ are $CH_3$.

29. The preceramic polymer formed by the method of claim 27.

30. The preceramic polymer formed by the method of claim 28.

* * * * *